United States Patent [19]

Kemp

[11] 3,875,130

[45] Apr. 1, 1975

[54] PREPARATION WITH SEEDING OF POLYMERS INSOLUBLE IN THEIR MONOMERIC COMPOSITIONS

[75] Inventor: Thomas Kemp, Bois-Colombes, France

[73] Assignee: Produits Chimiques Pechiney-Saint Gobain, Neuilly-sur-Seine, France

[22] Filed: Mar. 2, 1973

[21] Appl. No.: 337,534

Related U.S. Application Data

[63] Continuation of Ser. No. 38,863, May 19, 1970, abandoned.

[30] Foreign Application Priority Data

May 19, 1969 France.............................. 69.16028

[52] U.S. Cl........... 260/87.1, 260/87.5 C, 260/87.7, 260/92.8 A, 260/92.8 R, 260/92.8 W, 260/875, 260/878 R, 260/884

[51] Int. Cl........................ C08f 15/30, C08f 15/00

[58] Field of Search... 260/875, 878 R, 884, 87.5 C, 260/92.8 A, 92.8 W, 92.8 R, 87.1

[56] References Cited

UNITED STATES PATENTS

| | | | |
|---|---|---|---|
| 2,961,432 | 11/1960 | Fikentscher et al. ............. | 260/92.8 |
| 3,492,257 | 1/1970 | Meyer et al........................ | 260/92.8 |
| 3,544,280 | 12/1970 | Thomas ............................ | 260/92.8 |

*Primary Examiner*—Joseph L. Schofer
*Assistant Examiner*—A. Holler

[57] ABSTRACT

This invention is addressed to a process for the preparation of polymers having a narrow granulometric distribution which are insoluble in their monomeric compositions wherein a vinyl monomer is polymerized in the presence of an organo soluble catalyst in the presence of seed particles having diameters within the range of 0.01–5 microns which are insoluble in the monomeric material.

28 Claims, No Drawings

PREPARATION WITH SEEDING OF POLYMERS INSOLUBLE IN THEIR MONOMERIC COMPOSITIONS

This is a continuation, division, of application Ser. No. 38,863, filed May 19, 1970, now abandoned.

This invention relates to the preparation of vinyl polymers which are insoluble in their monomeric compositions in the presence of seed particles.

It is an object of the present invention to produce and to provide a method for producing polymers of vinyl chloride or copolymers of vinyl chloride with at least one other vinyl-type monomer which is copolymerizable therewith having a narrow granulometric distribution, and it is a related object of the invention to produce and to provide a method for producing vinyl-type polymers and copolymers of the type described. The granules or particles of the resulting product have a diameter of between 10-60 microns, and more precisely preferably 20-50 microns.

The concepts of the present invention reside in a process for preparing polymers of vinyl chloride and copolymers of vinyl chloride and at least one other monomer copolymerizable therewith in which the polymerization of the monomer composition is carried out in the presence of a seeding product prepared by the polymerization in emulsion or fine suspension and of which the particles have diameters within the range of 0.01-5 microns, and preferably 0.05-2 microns. It has been found that vinyl polymers prepared in this manner have a narrow granulometric distribution in which the polymer granules have a diameter within the range of 10-60 microns, and more precisely from 20-50 microns.

As indicated above, the seeding product is prepared by polymerization of a seed monomeric composition in emulsion or fine suspension. According to one form of the invention, the seed product is prepared by atomization of a latex of a copolymer or polymer from vinyl-type monomers by polymerization in emulsion or in fine suspension. Thereafter, the particles formed by atomization of the latex are ground, and the particles having a diameter within the range of 0.01-5 microns, and preferably 0.05-2 microns are separated from the particles having diameters falling outside these ranges. The separated particles are then used as the seed product in accordance with the concept of this invention.

According to a second form of this invention, a latex of the seed polymer is prepared in the manner described above, by polymerization in emulsion or fine suspension, and the resulting latex is atomized to separate the particles from the serum. Thereafter, the particles are eventually ground and are treated with an organic liquid "semi-solvent," which operates, without dissolving the seed polymers, to separate the polymeric material into the free micellae. The resulting micellae can then be used as the seeding product in accordance with the practice of the present invention.

For best results, it is generally preferred that the atomization of the seed polymer latex be carried out at a temperature as low as possible. For this purpose, use is preferably made of an automization temperature within the range of 60-85°C and preferably 65°-75°C.

In accordance with a third form of the present invention, the seeding product is prepared by separating (i.e., filtration or centrifugal decantation) a latex of the seed polymer prepared by polymerizing in emulsion or in fine suspension, followed by contacting the resulting cake containing the seed polymer particles eventually after drying with the monomeric composition to be used in the preparation of the polymers of the present invention. Thereafter, the seed particles have the desired diameters, and are used as the seeding product for the polymerization reaction in accordance with the practice of the present invention.

In accordance with a fourth form for preparing the seed product for use in the present invention, a latex of the seed polymer is prepared by polymerization in emulsion or in fine suspension, and treated by filtration or centrifugal decantation. Thereafter, the resulting cake containing the seed particles is treated eventually after drying with an organic liquid "semi-solvent," which operates, without dissolving the seed particles, to cause the polymeric material to break down into the micellae of the latex. The resulting seed particles can then be used in accordance with the method of the present invention.

The last two methods described above for preparing the seed particles as used in the present invention, can satisfactorily be used in cases where the micellae constituting the latex have diameters greater than 0.5 microns. After filtration or centrifugal decantation, there is obtained a cake containing about 30 percent by weight water and composed of the micellaes which are agglomerated.

When use is made of a semi-solvent to break down the polymeric particles to the micellae constituting the latex, use is preferably made of an amount of the semi-solvent ranging from 30-400 percent, and preferably 50-150 percent based upon the weight of the seed product. As the semi-solvent which can be used in accordance with the concept of the present invention, use can be made of a wide variety of materials, including plasticizers for the polymers and copolymers produced, such as the alkyl phthalates, alkyl adipates and the alkyl isobutyrates. Representative of the compounds include diethyl phthalate, octyl adipate and isobutyrate plasticizers commercially available under the tradename of Texanol. In general, the alkyl groups of the foregoing plasticizers contain between 1-25 carbon atoms. In addition to the foregoing semi-solvents, use can also be made of aliphatic chlorinated hydrocarbons containing 1-3 carbon atoms including dichloroethane and methylene chloride.

As indicated above, the seeding product is prepared by polymerization of a monomeric composition in emulsion or in fine suspension. The monomeric materials used to prepare the seed product can be selected from the same monomeric materials which are polymerized in the presence of the seeding product to form the new and improved vinyl polymers of the present invention. One method for preparing the seed polymers in emulsion polymerization involves forming a reaction mixture containing water, a monomeric composition containing either vinyl chloride or a mixture of vinyl chloride and at least one other vinyl monomer copolymerizable therewith, a dispersing agent of the emulsifying type and at least one catalyst which is water-soluble. The concentration of the monomeric composition is generally between 30-55 percent by weight, and preferably 40-50 percent, based upon the entire quantity of the reaction mixture. The organic components can be mixed with the water in the reaction mixture by means of standard agitation achieved by, for example, a propeller rotating at low speed, such as a speed within the range of 30–100 rpm. The resulting emulsified reaction mixture is heated at an autogenous pressure while containing the agitation. The temperature to be used for the most part depends upon the characteristics of the product desired, and can accordingly be varied within wide ranges.

At the end of the reaction, the heating is stopped and the unreacted monomer or monomers are removed by degasification.

As the dispersing agent, use can be made of many of a wide variety of compounds known to those skilled in the art. For best results, use should be made of between 0.02–5 percent, and preferably 0.4–1 percent by weight of the emulsifier based upon the weight of the monomeric composition. Suitable emulsifiers include the anionic emulsifiers, such as alkyl aryl sulfonates, alkyl sulfates and alkali metal salts of fatty acids and mixtures thereof. In addition, use can also be made of nonionic emulsifiers, such as fatty alcohols and the condensation product of an alkyl phenol with ethylene oxide. As the watersoluble catalyst, use can be made of a wide variety of catalysts used for this purpose. Representative are the alkali metal persulfates, such as potassium persulfate, hydrogen peroxide or a redox system formed of an organic hydroperoxide, such as tertiary butyl hydroperoxide, in admixture with a reducing agent, such as sodium formaldehyde sulphoxylate. The quantity of the catalyst used is not critical and can be varied within wide ranges. For best results, use should be made of a quantity of catalyst corresponding to between 0.01 and 1 percent and preferably 0.025 to 0.25 percent by weight of the catalyst based upon the weight of the monomeric composition.

As indicated above, seed polymer can also be prepared by polymerization of the monomeric seed mixture by polymerization in fine suspension. In accordance with this method for preparing the seed product, a reaction mixture including water, the monomeric seed composition formed of vinyl chloride or a mixture of vinyl chloride and at least one other vinyl monomer which is copolymerizable therewith, a dispersing agent, and an organo-soluble catalyst is prepared. For best results, the concentration of the monomeric composition should generally be an amount between 20–55 percent and preferably 40–45 percent by weight of the monomeric mixture, based upon the total quantity of the reaction mixture. The organic components can be generally dispersed in the water by means of a high pressure rotating homogenizer or a high speed rotating turbine. The resulting fine suspension is then heated to an autogenous pressure while continuing the agitation at a temperature which is determined by the characteristics of the product desired. At the end of the reaction, the heating is stopped and the unreacted monomers are removed.

As the dispersing agent, use can be made of a wide variety of protective colloids or a variety of emulsifiers, which are used in amounts corresponding to between 0.02–5 percent by weight, and preferably 1 to 3 percent by weight based upon the weight of the monomeric compositions. Protective colloids which can be used as the dispersing agent include polyvinyl alcohol, methyl celluloses, carboxy celluloses and gelatin. In addition, use can also be made of the anionic emulsifiers of the type described above.

As the organo-soluble catalysts use can be made of a wide variety of catalysts which are soluble in the organic phase and insoluble in water. Representative of this type of catalyst are the organic peroxides, such as lauroyl peroxide, tertiary butyl diethyl peracetate, diethylhexyl percarbonate and diacetyl peroxide. The quantity of the catalyst can be varied within wide ranges. For best results, use should be made of between 0.02–1 percent, anjd preferably 0.1–0.5 percent by weight of the catalyst based upon the weight of the monomeric composition.

In carrying out the polymerization of the monomers in the presence of the seed product, use is preferably made of an amount of seed product corresponding to between 1–20 percent, and preferably 2–10 percent by weight based upon the weight of the monomeric materials. As indicated above, the monomeric materialas which can be polymerized in the presence of the seed product in accordance with the practice of the present invention are selected from the same monomeric materials which are used in forming the seed product. However, the polymer or copolymer formed should be insoluble in the initial monomeric composition.

The concepts of the present invention are applicable to the preparation of polymers of vinyl chloride as well as copolymers of vinyl chloride with at least one other vinyl polymer which is copolymerizable with vinyl chloride. For example, as the other monomer, use can be made of at least one olefin, such as ethylene, propylene, butene-1, butene-2, isobutene, methyl-4-pentene-1; vinyl acetate; and mixtures thereof and one or more of the foregoing olefins and vinyl acetate. As the monomer copolymerizable with vinyl chloride, use can also be made of vinylidene chloride, provided that the resulting copolymers are insoluble in their corresponding monomeric compositions.

By way of example, the following monomeric compositions can be used in accordance with the practice of the present invention to form a copolymer which is insoluble in its corresponding monomeric composition:

a monomeric composition containing vinyl chloride and foming 0.1–30 percent by weight, and preferably 0.1–10 percent by weight of at least one olefin;

a monomeric composition containing vinyl chloride and between 0.1–30 percent by weight, and preferably 0.1–15 percent by weight of vinyl acetate;

a monomeric composition containing vinyl chloride and between 0.01–30 percent by weight, and preferably 0.1–20 percent by weight of vinylidene chloride.

In carrying out the polymerization of the monomeric composition of the type described above in the presence of the seeding product, use should be made of an organo-soluble catalyst. Representative of catalysts which are soluble in an organic phase, but insoluble in an aqueous phase include organic peroxides, such as lauroyl peroxide, diethylhexylpercarbonate, azobisisobutyronitrile, isopropylperoxy dicarbonate, sulfonylacetylcyclohexane peroxide, tertiobutyl perpivalate, alphachlorocaproyl peroxide, as well as mixtures thereof. The quantity is not critical and can be varied within wide ranges. It has been found that best results are obtained when the amount of the catalyst is betwen 0.1–1 percent by weight, and preferably .02–0.2% by weight of the monomeric composition.

The polymerization reaction can be carried out within a wide range of temperatures depending upon the characteristics desired in the final product. In general, the polymerization temperature should be −50° to 90°C, and preferably 30°–75°C.

It has been found in accordance with the practice of the present invention that when the temperature of the reaction medium is raised to the selected polymerization temperature, organo-soluble catalysts initiate the polymerization reaction of the monomeric composition on the particles of the seeding product, and do not result in the formation of new particles.

The granule size of the final product is directly related to the degree of fineness and the number of particles forming the seeding product. However, during the polymerization reaction agglomeration may occur between the particles with the result that the granule size of the final product is somewhat higher than that which is to be expected. The type of catalyst, additives, agitation and atomization temperatures influence the agglomeration, and can thereby be controlled to minimize undesirable agglomeration.

The features of the present invention reside not only in the methods by which the polymers and copolymers of the present invention are produced, but also to the polymers and copolymers produced by the invention, which are insoluble in their monomeric compositions. The new and improved process of the present invention provides a very narrow granulometric distribution in which the granules have a diameter within the range of 10–60 microns, and more precisely 20–50 microns.

When the polymerization reaction is carried out at a temperature of between 50°–70°C., the polymers and copolymers produced form relatively compact granules which have been found to be particularly useful and advantageous as a fluidizer for plastisols. As compared to fluidizers usually used in preparing plastisols, the polymer of the present invention can be produced at lower cost. Due to their fineness, the particles produced by the process of the present invention do not decant in plastisols and can be used as fluidizers in an amount within the range of 10–50 percent by weight of the entire quantity of the polymers used in plastisols in place of the polymers for plastisols prepared by polymerization in emulsion, to prepare a polymers having improved rheological properties.

Having described the basic concepts of the present invention, reference is now made to the following examples which are presented by way of illustration, and not by way of limitation, of the practice of the invention.

EXAMPLE 1

Preparation of the Seed Product by Polymerization in Emulsion

Into an autoclave having a capacity of 120 liters equipped with a propeller mixer rotating at 50 rpm, there is placed 40 kg. of vinyl chloride, 0.1 kg. of potassium laurate, 0.012 kg. of potassium persulfate and 60 kg. of water. The reaction vessel is then heated at a temperature of 52°C under autogenous pressure. After about 8 hours, the pressure drops and the heating is stopped and the unreacted vinyl chloride is removed. The resulting latex contains about 35 percent by weight polyvinyl chloride in which the particles have a diameter of 0.15 microns.

The resulting latex is then atomized at 65°C and the resulting particles are ground, then treated with diethyl phthalate in the ratio of 40 parts by weight of the phthalate to 60 parts by weight of the polymer. After agitation of the phthalate-polymer mixture for 10 minutes, it is observed under a microscope that all the particles of the mixture have a diameter of less than 5 microns.

POLYMERIZATION ACCORDING TO THE PROCESS OF THIS INVENTION

Into a vertical autoclave with a capacity of 500 liters equipped with a ribbon mixer rotating at 100 rpm, there is placed 15 kg. of the dispersion prepared above containing the seed product, 250 kg. of vinyl chloride and 0.2 kg. lauroyl peroxide. The polymerization reaction is carried out at a temperature of 65°C for a period of 6 hours until the pressure in the reaction vessel begins to decrease. Thereafter, the unreacted monomer is removed, and there is obtained 210 kg. of polymer formed of granules having a diameter within the range of 15–60 microns and having the properties described in Table I.

TABLE I

| PROPERTIES | PRODUCT EXAMPLE 1 |
| --- | --- |
| Apparent bulk density (g/cm$^3$) | 0.55 |
| Viscosity index AFNOR according to the French standard specification NFT 51013 | 90 |
| Average diameter of the granules(microns) | 30 |

This polymer is an excellent fluidizer for plastisols.

When 30 parts by weight of this polymer is mixed with 30 parts by weight of a polymer for plastisols, which is obtained by polymerization in emulsion, commercially available under the tradename "Lucovyl PE 1801," and 40 parts by weight of dioctyl phthalate, the result is a plastisol having a viscosity at 25°C of 4,000 centipoises measured immediately by means of a viscometer which is commercially available in France under the name of Drage Viscometer.

After conditioning for a week, the viscosity of the plastisol is 6,000 centipoises at a temperature of 25°C. By way of comparison, when 60 parts by weight of "Lucovyl PE 1801" is admixed with 40 parts by weight of dioctyl phthalate, there is obtained a plastisol having a viscosity at 25°C of 5,000 centipoises when measured immediately with a Drage viscometer and 10,000 centipoises after conditioning for a week at 25°C.

EXAMPLE 2

Preparation of the Seeding Product by Polymerization in Fine Suspension

Into an autoclave with a capacity of 120 liters there is placed 40 g. of vinyl chloride, 0.1 kg. of lauroyl peroxide, 0.28 kg. of sodium dodecylbenzenesulfonate and 60 kg. of water. The organic components are dispersed in the aqueous phase at room temperature by means of a propeller mixer at 100 rpm. Thereafter, the predispersion is passed through a homogenizer known in France under the name of "Manton Gaulin homogenizer" under a pressure of 70 bars to provide a fine suspension.

Thereafter, the resulting fine suspension is placed into an autoclave having a capacity of 120 liters equipped with a propeller mixer rotating at 50 rpm. The autoclave is heated to 52°C. under autogenous pressure. After about 10 hours the pressure in the autoclave decreases, the heat is stopped and the unreacted vinyl chloride is removed, and a latex is obtained having 35.5 percent by weight of polyvinyl chloride, the particles of which have a diameter within the range of 0.5 to 1.3 microns and an average of 0.8 microns.

The resulting latex is then filtered on a drum covered with a filtering cloth and a cake is obtained having 30 percent by weight water.

POLYMERIZATION ACCORDING TO THE PROCESS OF THIS INVENTION

Into a vertical autoclave equipped with a ribbon mixer rotating at 100 rpm and having a capacity of 500 liters, there is introduced 14 kg. of the cake prepared in the manner described above containing the seed product, 250 kg. of vinyl chloride and 0.05 kg. of isopropyl peroxidicarbonate. The polymerization reaction is carried out at a temperature of 50°C. corresponding to an autogenous pressure of 7 bars. After 7 hours, the pressure is 6 bars and the reaction is stopped.

After degasing and drying, there is obtained 190 kg. of a polymer formed of granules having diameters between 15–30 microns, and which have the properties described in Table II.

TABLE II

| PROPERTIES | PRODUCT EXAMPLE 2 |
|---|---|
| Apparent bulk density (g/cm³) | 0.42 |
| Viscosity index AFNOR according to the French standard specification NFT 51013 | 130 |
| Average diameter of the granules (microns) | 25 |

EXAMPLE 3

PREPARATION OF THE SEEDING PRODUCT BY POLYMERIZATION IN FINE SUSPENSION

In an autoclave having a capacity of 120 liters, there is placed 45 kg. of vinyl chloride, 0.225 kg. lauroyl peroxide, 0.9 kg. sodium dodecylbenzenesulfonate and 55 kg. of water. The resulting mixture is formed into a dispersion at room temperature by means of a turbine rotating at 2,900 rpm for 1 hour.

The resulting fine suspension is then placed into an autoclave having a capacity of 120 liters and equipped with a propeller mixer rotating at 50 rpm. The autoclave is heated to 46° C. under autogenous pressure. After about 6 hours, the pressure decreases, the heating is stopped and the unreacted vinyl chloride is removed. A latex is obtained with 46 percent by weight vinyl chloride and particles with an average diameter of 0.06 microns.

The resulting latex is then atomized at 65°C to separate the particles. The resulting particles are ground and then treated with diethyl phthalate in the ratio of 35 parts by weight of phthalate per 65 parts by weight of the polymer. After agitation for 10 minutes, it is observed by means of a microscope that all the particles have a diameter of less than 5 microns.

COPOLYMERIZATION ACCORDING TO THE PROCESS OF THE PRESENT INVENTION

Into a vertical autoclave having a capacity of 500 liters equipped with a ribbon mixer rotating at 100 rpm., there is placed 15 kg. of the dispersion prepared in the manner described above containing the seed product, 240 kg. vinyl chloride, 10 kg. vinyl acetate, and 0.1 kg. isopropyl peroxidicarbonate. The polymerization reaction is carried out at 55°C for 6 hours. After the removal of unreacted monomer, there is obtained 225 kg. of a copolymer having granules with a diameter of 15–60 microns, and having other properties described in Table III.

TABLE III

| PROPERTIES | PRODUCT EXAMPLE III |
|---|---|
| Apparent bulk density (g/cm³) | 0.50 |
| Viscosity index AFNOR according to the French standard specification NFT 51013 | 110 |
| Rate of copolymerized vinyl acetate (%) | 3.5 |
| Average diameter of the granules (microns) | 35 |

It will be apparent from the foregoing that I have provided a new and improved method for preparing vinyl polymers having a narrow granulometric distribution. The polymers of the present invention can be prepared in a simple and efficient manner by reacting a monomeric mixture of vinyl monomer in the presence of a seed mixture in which the polymeric seed particles have a particle size within the range of 0.01–5 microns and preferably 0.05–2 microns.

It will be apparent that various changes and modifications may be made in the details of formulation, provedure and use without departing from the spirit of the invention, especially as defined in the following claims.

I claim:

1. A process for the preparation of vinyl polymers having a narrow granulometric distribution which are insoluble in their monomeric compositions, comprising polymerizing a monomeric material selected from the group consisting of vinyl chloride and a mixture consisting essentially of a vinyl chloride with at least one other vinyl monomer copolymerizable therewith in the presence of an organo soluble catalyst and in the presence of 1–20 percent by weight of seed particles having a diameter within the range of 0.01 to 5 microns which are insoluble in the monomeric material, said seed particles being obtained by treating with a semi-solvent a polymer selected from the group consisting of a polyvinyl chloride and a copolymer of vinyl chloride with at least one other vinyl monomer copolymerizable therewith and prepared by polymerization in emulsion or fine suspension.

2. A process as defined in claim 1 wherein the seed particles have a diameter within the range of 0.01 to 2 microns.

3. A process as defined in claim 1 wherein the seed particles are derived from a latex formed by polymerizing a seed monomer selected from the group consisting of vinyl chloride and a mixture of vinyl chloride with at least one other vinyl monomer copolymerizable therewith in emulsion or fine suspension.

4. A process as defined in claim 1 wherein the seed particles are prepared by polymerizing a seed monomer selected from the group consisting of vinyl chloride and a mixture of vinyl chloride with at least one other vinyl monomer copolymerizable therewith in emulsion or fine suspension to form a latex, separating the resulting seed polymer from the latex by atomizing the latex, and treating the seed polymer particles with a semisolvent whereby the particles are broken down into their constitutive micellae.

5. A process as defined in claim 4 wherein the seed polymer separated from the latex by atomizing the latex is ground prior to treatment with the semi-solvent.

6. A process as defined in claim 4 wherein the temperature of the latex during atomization is within the range of 60°–85°C.

7. A process as defined in claim 4 wherein the temperature of the latex during atomization is within the range of 65°–75°C.

8. A process as defined in claim 1 wherein the seed particles are prepared by polymerizing a seed monomer selected from the group consisting of vinyl chloride and a mixture of vinyl chloride with at least one other vinyl monomer copolymerizable therewith in emulsion or fine suspension to form a latex, treating the said latex by filtration and treating the resulting cake containing the seed polymer with a semi-solvent whereby the seed polymer particles are broken down into their constitutive micellae.

9. A process as defined in claim 1 wherein the seed particles are prepared by polymerizing a seed monomer selected from the group consisting of vinyl chloride and a mixture of vinyl chloride with at least one other vinyl monomer copolymerizable therewith in emulsion or fine suspension to form a latex, treating the said latex by centrifugal decantation and treating the resulting cake containing the seed polymer with a semi-solvent whereby the seed polymer particles are broken donw into their constitutive micellae.

10. A process as defined in claim 4 wherein said semi-solvent is selected from the group consisting of plasticizers for said vinyl polymer and aliphatic chlorinated hydrocarbons.

11. A process as defined in claim 4 wherein said semi-solvent is a plasticizer selected from the group consisting of alkyl phthalates, adipates and isobutyrates.

12. A process as defined in claim 4 wherein the semi-solvent is used in an amount corresponding to 30 to 400 percent by weight based upon the weight of the seed polymer particles.

13. A process as defined in claim 4 wherein the semi-solvent is used in an amount corresponding to 50 to 150 percent by weight based upon the weight of the seed polymer particles.

14. A process as defined in claim 3 wherein the seed particles are derived from a latex prepared by polymerization of the seed monomer in emulsion in the presence of a water-soluble free radical catalyst.

15. A process as defined in claim 3 wherein the seed particle are derived from a latex prepared by polymerization in fine suspension in the presence of an organo soluble catalyst.

16. A process as defined in claim 1 wherein the organo soluble catalyst is selected from the group consisting of lauroyl peroxide, diethylhexylpercarbonate, azobis-isobutyronitrile, isopropylperoxy dicarbonate, sulfonyl-acetylcyclohexane peroxide, tertiobutyl perpivalate, alphachloroaproyl peroxide, and mixtures thereof.

17. A process as defined in claim 1 wherein the catalyst is employed in an amount within the range of .01 to 1 percent by weight based on the weight of the monomeric material.

18. A process as defined in claim 1 wherein the catalyst is employed in an amount within the range of 0.02 to 0.2 percent by weight based on the weight of the monomeric material.

19. A process as defined in claim 1 wherein the reaction is carried out within the range of 30° to 75°C.

20. A process as defined in claim 1 wherein the reaction is carried out within the range of −50° to 90°C.

21. A process as defined in claim 1 wherein the seed particles constitute between 2–10 percent by weight based on the weight of the monomeric material.

22. A process as defined in claim 1 wherein said other monomer is selected from the group consisting of olefins, vinyl acetate, vinylidene chloride and mixtures thereof.

23. A process as defined in claim 1 wherein said other monomer constitutes between 0.1 and 30 percent by weight based on the total weight.

24. A process as defined in claim 3 wherein the other vinyl monomer of said seed polymer is selected from the group consisting of olefins, vinyl acetate, vinylidene chloride and mixtures thereof.

25. Polymers prepared by the process of claim 1 having grain diameters within the range of 10–60 microns and being insoluble in said monomeric material.

26. A process as defined in claim 3 wherein the seed particles are prepared from a monomeric composition which is the same as said monomeric material.

27. A process as defined in claim 8 wherein the cake is dried before treating with the semi-solvent.

28. A process as defined in claim 9 wherein the cake is dried before treating with the semi-solvent.

* * * * *

UNITED STATES PATENT OFFICE
CERTIFICATE OF CORRECTION

Patent No. 3,875,130     Dated April 1, 1975

Inventor(s) THOMAS KEMP

It is certified that error appears in the above-identified patent and that said Letters Patent are hereby corrected as shown below:

On the front page of the patent, first column, under the heading "Foreign Application Priority Data", "69.16028" should read -- 69.16088 --.

Signed and Sealed this

Third Day of August 1976

[SEAL]

Attest:

RUTH C. MASON
Attesting Officer

C. MARSHALL DANN
Commissioner of Patents and Trademarks